US012240084B2

(12) United States Patent
Dieter et al.

(10) Patent No.: US 12,240,084 B2
(45) Date of Patent: Mar. 4, 2025

(54) POWER TOOL DEVICE AND METHOD

(71) Applicant: FESTOOL GMBH, Wendlingen (DE)

(72) Inventors: Christoph Dieter, Gomaringen (DE); Moritz Keller, Fellbach (DE); Peter Seiler, Dornstadt (DE)

(73) Assignee: Festool GmbH, Wendlingen (DE)

( * ) Notice: Subject to any disclaimer, the term of this patent is extended or adjusted under 35 U.S.C. 154(b) by 41 days.

(21) Appl. No.: 18/000,600

(22) PCT Filed: Mar. 30, 2021

(86) PCT No.: PCT/EP2021/058332
§ 371 (c)(1),
(2) Date: Dec. 2, 2022

(87) PCT Pub. No.: WO2021/244790
PCT Pub. Date: Dec. 9, 2021

(65) Prior Publication Data

US 2023/0219204 A1 Jul. 13, 2023

(30) Foreign Application Priority Data

Jun. 4, 2020 (DE) ..................... 10 2020 207 023.7

(51) Int. Cl.
*B25B 23/147* (2006.01)
*B25D 16/00* (2006.01)
*B25F 5/00* (2006.01)

(52) U.S. Cl.
CPC ............ *B25B 23/147* (2013.01); *B25F 5/001* (2013.01); *B25D 16/006* (2013.01)

(58) Field of Classification Search
CPC .......... B25B 23/147; B25F 5/001; B25F 1/00; B25D 16/006

(Continued)

(56) References Cited

U.S. PATENT DOCUMENTS 5,440,215 A 8/1995 Gilmore
5,738,177 A * 4/1998 Schell .................... B25B 23/14 173/181

(Continued)

FOREIGN PATENT DOCUMENTS

DE 694 23 823 T2 11/2000
DE 10 2016 211 937 1/2018

(Continued)

OTHER PUBLICATIONS

Examination Report issued in corresponding German Patent Application No. 10 2020 207 023.7, Jan. 5, 2021, 8 pages.

(Continued)

*Primary Examiner* — David Luo
(74) *Attorney, Agent, or Firm* — HSML P.C.

(57) ABSTRACT

A power tool device, in particular a screwing and/or drilling device, including a drive unit for a rotational driving of a tool, in particular a drill or a screwdriver blade. The power tool device is adapted to detect at least one drive variable (AG) during the rotational driving of the tool, in which the drive variable (AG) is the torque acting on the tool and/or a drive variable associated with this torque, for example an electrical drive variable of the drive unit. The power tool device is adapted to determine a change criterion during the rotational driving of the tool on the basis of the at least one detected drive variable (AG) and to change the rotational driving of the tool in response to the detected drive variable (AG) satisfying the change criterion.

21 Claims, 5 Drawing Sheets

(58) Field of Classification Search
USPC ........................................................ 318/434, 3
See application file for complete search history.

(56) References Cited

U.S. PATENT DOCUMENTS

| | | | | |
|---|---|---|---|---|
| 8,919,456 | B2 | 12/2014 | Ng et al. | |
| 10,293,469 | B2 * | 5/2019 | Leong | B25B 21/02 |
| 10,682,752 | B2 * | 6/2020 | Hecht | B25B 23/141 |
| 2011/0308827 | A1 | 12/2011 | Kaufmann | |
| 2013/0327552 | A1 | 12/2013 | Lovelass et al. | |
| 2018/0200872 | A1 | 7/2018 | Leong | |
| 2019/0030698 | A1 | 1/2019 | Frenken | |

FOREIGN PATENT DOCUMENTS

| | | |
|---|---|---|
| EP | 2 397 258 | 12/2011 |
| EP | 2 527 091 | 11/2012 |
| JP | 10-235538 | 9/1998 |
| JP | 2008-213088 | 9/2008 |
| JP | 2013-255987 | 12/2013 |
| JP | 2017-517406 | 6/2017 |
| WO | 2015/193022 | 12/2015 |
| WO | 2017/129385 | 8/2017 |

OTHER PUBLICATIONS

International Search Report issued in International Application No. PCT/EP2021/058332, Jul. 19, 2021, 5 pages w/translation.

Written Opinion issued in International Application No. PCT/EP2021/058332, Jul. 19, 2021, 7 pages.

Notice of Reasons for Refusal issued in corresponding Japanese Patent Application No. 2022-574385, Dec. 5, 2024, 11 pages w/translation.

* cited by examiner

POWER TOOL DEVICE AND METHOD

The invention relates to a power tool device, in particular a screwing and/or drilling device, comprising a drive unit for the rotational driving of a tool, in particular a drill or a screwdriver blade. The power tool device is adapted to detect at least one drive variable during the rotational driving of the tool. The drive variable is the torque acting on the tool and/or a drive variable associated with this torque, for example an electrical drive variable of the drive unit.

In a conventional power tool device, such as a conventional cordless screwdriver, the user can set a torque limit to limit the torque applied to the tool. By selecting the correct value for the torque limit, the user can cause a working operation performed with the power tool device, for example a screwing operation and/or a drilling operation, to stop at a desired working condition. For a screwing-in operation of a screw into a processing object, it is usually desirable to set the torque limit to the screwing-in torque of the screw head so that the screwing-in operation stops when the screw head has reached the surface of the processing object or is flush with the surface.

U.S. Pat. No. 8,919,456 B2 describes a method for controlling an operation of a power tool. The current supplied to the electric motor of the power tool is sampled periodically. Linear regression is used to determine a slope of a sequence of current measurements. Based at least in part on the sequence of current measurements, a transmission of torque to an output spindle is interrupted.

SUMMARY OF THE INVENTION

It is an object of the invention to make it easier for a user to achieve a desired result when working with the power tool device.

The object is solved by a power tool device according to claim 1. The power tool device is adapted to determine a change criterion during the rotational drive of the tool based on the at least one detected drive variable and to change the rotational drive of the tool in response to the detected drive variable satisfying the change criterion.

In order to achieve a desired result, it is necessary during a working operation with the power tool device to change the rotational driving of the tool at the right time, for example to reduce it, to stop it and/or to change it to a pulsed operation. In particular, the working operation is a screwing-in operation or a drilling operation. For example, in a screwing-in operation, it is usually necessary to change the rotational driving, for example to reduce it, to stop it and/or to change it to a pulsed operation, at the right time, so that a screw driven by the tool is not further screwed into a processing object. The right time is, for example, when the top of the screw head has a desired position relative to the surface of the processing object, for example, when the top of the screw head is flush with the surface of the processing object.

With the conventional power tool device mentioned at the beginning, the user must know in advance which torque limit he must set for a particular working operation so that the desired result is achieved. Which torque limit achieves the desired result depends, for example, on the processing object, in particular its material, on the tool and/or on the screw to be screwed in. There is a risk that the user may make a mistake when selecting the torque limit, which can result in the working operation not being stopped at the correct time, so that the desired result—for example a desired screwing-in depth—is not achieved.

As mentioned above, in the present power tool device the change criterion, on the basis of which the rotational driving is changed, is determined during the rotational driving—i.e. during the current working operation, for example during the current screwing-in operation. This can ensure that the appropriate change criterion is selected for the current working operation, for example for the current processing object, for the current tool and/or for the current screw to be screwed in. The drive variable detected during the rotational driving depends on the processing object, the tool and/or the screw, so that the suitable change criterion for the current working operation can be determined on the basis of this detected drive variable. The suitable change criterion can consequently be determined automatically by the power tool device, which can make it easier for the user to achieve the desired result when working with the power tool device.

Preferably, the change criterion comprises a change threshold. For example, the drive variable fulfills the change criterion when the slope of the drive variable reaches the change threshold.

According to a preferred embodiment, the power tool device is configured to calculate a slope value of the detected drive variable during the rotational driving of the tool 2, to calculate the change threshold value based on the slope value, for example by multiplication with a factor, and to continuously compare a current slope of the drive variable with the change threshold value. The power tool device is preferably adapted to change, in response to the comparison indicating that the current slope has reached the change threshold value, the rotational driving of the tool 2, for example to stop, reduce, or change to pulsed operation. In particular, the power tool device is adapted to recalculate for each operation, in particular each screwing-in operation, for example each rotational driving, its own change threshold value that is individual for this operation.

Preferably, the power tool device determines the change threshold value only once per working operation, for example per screwing-in operation, and preferably on the basis of the single slope value determined during the working operation. In particular, the power tool device is adapted to perform the comparison with the current slop only after the change threshold value has been determined. The power tool device is preferably adapted to determine the change threshold value individually—i.e., anew—for each screwing-in operation.

Preferably, the change criterion, in particular the change threshold, is calculated on the basis of one or more detected drive variables.

Advantageous further developments are the subject of the dependent claims.

The invention further relates to a method for operating a power tool device, in particular a screwing and/or drilling device, having a drive unit for a rotational driving of a tool, in particular a drill or a screwdriver blade, comprising the steps of: starting the rotational driving of the tool, detecting at least one drive variable during the rotational driving of the tool, the drive variable being the torque acting on the tool and/or a drive variable associated with this torque, for example an electrical drive variable of the drive unit, determining a change criterion on the basis of the detected at least one drive variable during the rotational driving of the tool, and changing the rotational driving in response to the detected drive variable satisfying the change criterion.

The method is expediently carried out with the described power tool device and/or is designed in accordance with a further development of the power tool device.

BRIEF DESCRIPTION OF THE DRAWINGS

Further exemplary details as well as exemplary embodiments are explained below with reference to the figures. Thereby shows FIG. 1 a schematic representation of a power tool device, FIG. 2 a temporal course of a drive variable and a temporal course of the slope of the drive variable, FIG. 3 a processing object and three screws that were screwed into the processing object in different screwing-in modes, FIG. 4 the power tool device with an attachment device, FIG. 5 the power tool device with a mobile device and FIG. 6 a flowchart of a method for operating the power tool device

DETAILED DESCRIPTION OF THE INVENTION

Figure 1:
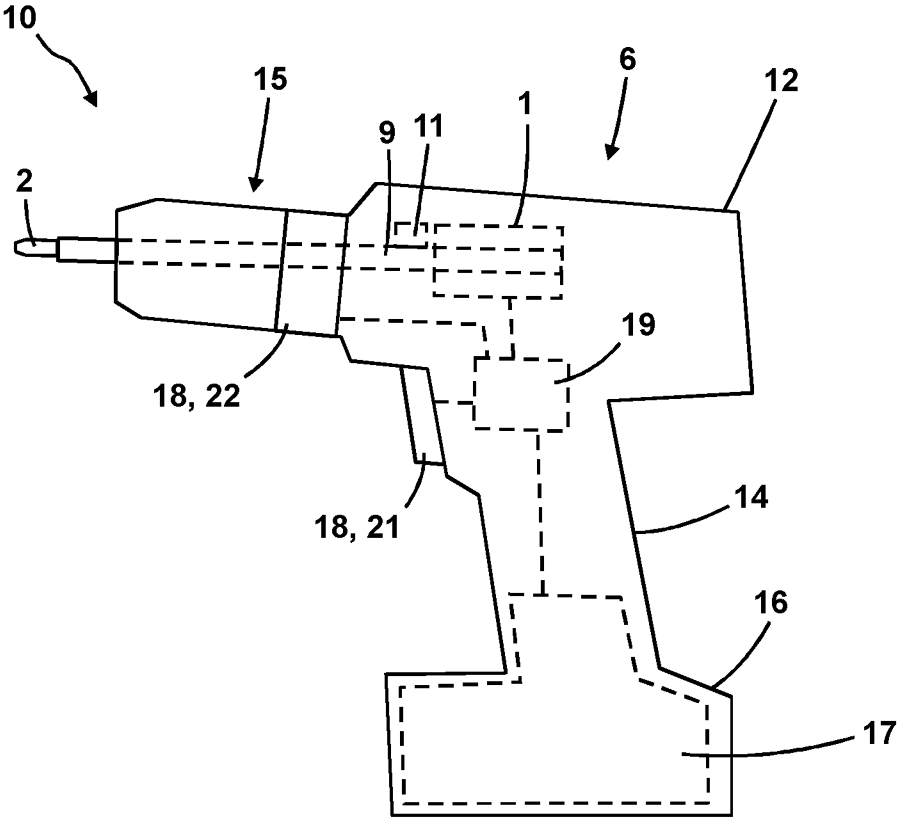

FIG. 1 shows a power tool device 10, which is exemplarily designed as a screwing and/or drilling device.

The power tool device 10 comprises a drive device 6 and, by way of example, a tool 2 attached to the drive device 6. The drive device 6 is designed as a handheld device. The drive device 6 is, for example, a drill screwdriver, in particular a cordless drill screwdriver. Exemplarily, the drive device 6 is T-shaped. Alternatively, the drive device can be of pistol-shaped design.

The drive device 6 has a handle section 14 that the user can grip with his hand to carry and guide the drive device 6. The handle section 14 is expediently oriented vertically with its longitudinal axis.

The drive device 6 further has a shaft section 15. The tool 2 is arranged at the front end of the shaft section 15. A shaft 9 expediently runs through the shaft section 15. The shaft section 15 is exemplarily oriented horizontally with its longitudinal axis.

The drive device 6 further comprises an energy storage section 16, exemplarily disposed at the bottom of the handle section 14. The energy storage section 16 comprises an energy storage device 17, for example a rechargeable battery.

The power tool device 10 comprises a drive unit 1 for a rotational driving of a tool 2. The drive unit 1 comprises, for example, an electric motor for the rotational driving of the tool 2. Exemplarily, the tool 2 is a screwdriver blade. Alternatively, the tool 2 may be a drill.

The power tool device 10 exemplarily comprises the shaft 9, via which the tool 2 is coupled to the drive unit 1, in particular the electric motor, so that the tool 2 can be set into a rotational motion by the drive unit 1 via the shaft 9. The power tool device 10, in particular the drive device 6, comprises an operating device 18, which exemplarily comprises a first operating element 21 and/or optionally a second operating element 22. The operating device 18, in particular the first operating element 21, is expediently used to control, in particular to start and/or stop, the rotational driving of the tool 2 provided by the drive unit 1. The first operating element 21 is preferably designed as a trigger button and is expediently arranged on the handle section 14. The optionally present second operating element 22 is expediently designed as a rotary switch. The second operating element 22 is used, for example, to select one of the screwing-in modes explained below.

The power tool device 10 comprises a control unit 19, which comprises, for example, a microcontroller. The control unit 19 serves in particular to detect a user input entered by means of the operating device 18, in particular by means of the first operating element 21 and/or the second operating element 22. The control unit 19 is adapted to control the drive unit 1 so that it provides the rotational driving of the tool 2. In particular, the control unit 19 is adapted to control the drive unit 1 taking into account the detected user input.

The drive device 6 comprises an outer housing 12, in which, for example, the control unit 19 and the drive unit 1 are arranged. The handle section 14 is exemplarily part of the outer housing 12.

The power tool device 10, in particular the drive device 6, is designed to detect at least one drive variable AG during the rotational driving of the tool 2. The drive variable AG is detected, for example, by means of the control unit 19.

Figure 2:
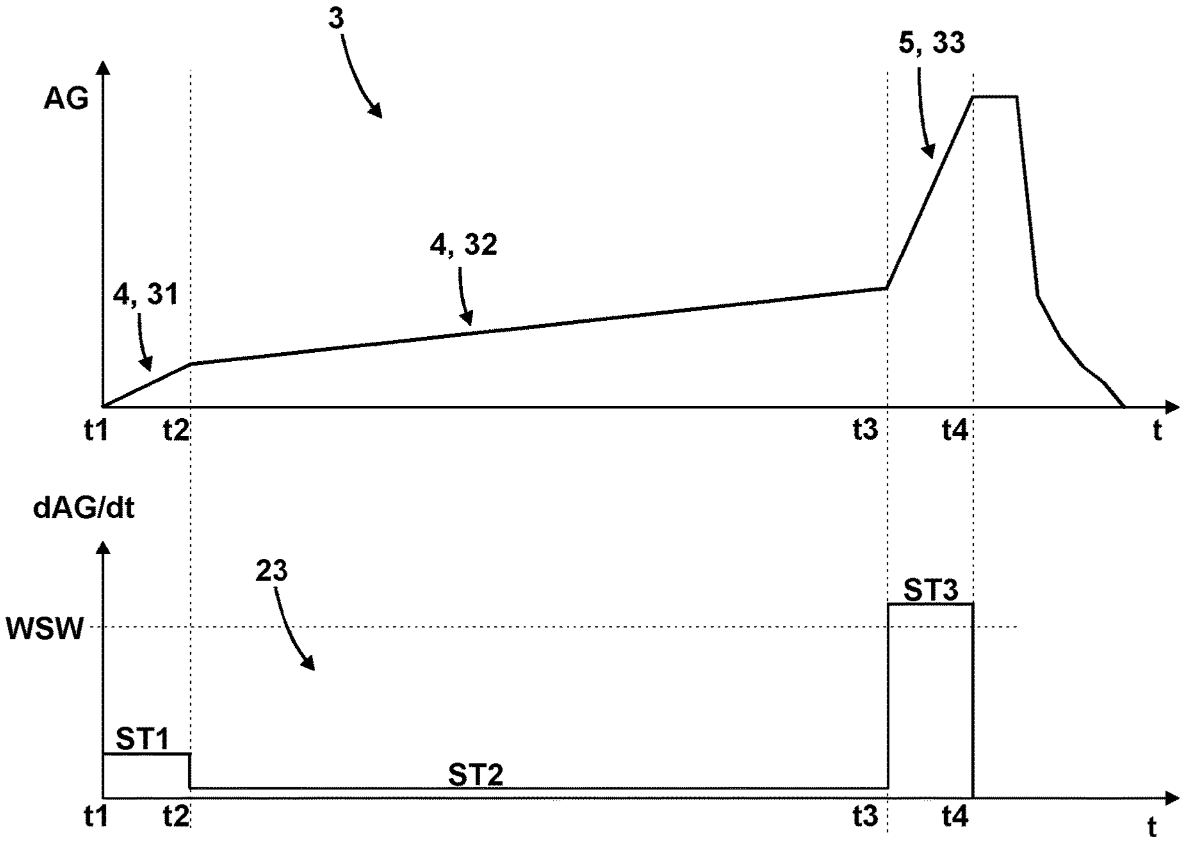

FIG. 2 shows an exemplary temporal course 3 of the drive variable AG recorded during a screwing-in operation as well as a temporal course 23 of the slope of the drive variable AG. The drive variable AG is a drive variable associated with this torque. In particular, the drive variable AG is a variable correlated with the torque acting on the tool 2. For example, the drive variable AG is an electrical drive variable of the drive unit 1. In particular, the drive variable AG is the electrical current supplied to the drive unit 1. For example, the drive variable AG is a motor current. Furthermore, the drive variable AG may be the torque acting on the tool 2.

The power tool device 10 is adapted to record the temporal course 3 of the drive variable AG. For example, the power tool device 10 is adapted to record the drive variable AG several times in succession, in particular periodically, in order to record the temporal course 3 of the drive variable AG. The temporal course 3 comprises a plurality of successively recorded values of the drive variable AG. The temporal course 3 can also be referred to as a drive variable curve or a drive variable characteristic curve. The drive variable AG is recorded by means of the control unit 19, for example.

In particular, the power tool device 10 is adapted to calculate the slope based on the temporal course 3. For example, the power tool device 10 is adapted to calculate the time derivative dAG/dt of the drive variable AG in order to obtain the slope. The slope is calculated by means of the control unit 19, for example.

The temporal course 3 shown in FIG. 2 can occur during a screwing-in operation carried out with the power tool device 10. The screwing-in operation begins at a first time t1, at which, for example, the user triggers the rotational driving of the tool 2, for example by actuating the first operating element 21. At this time, the tool 2 is in engagement with the screw head of a screw that is to be screwed into a processing object, for example a workpiece. In a first time range from the first time t1 to a second time t2, the drive variable AG increases with a first slope ST1, which expediently lies in a first slope range. The first time range may also be referred to as the first slope section 31. At the first slope section 31, the screw enters the material of the processing object and splits the material. Exemplarily, in the first slope section 31 the torque acting on the tool 2—and in particular the drive variable AG correlated with the torque—increases continuously. The first slope section 31 has an approximately linear slope. Purely by way of example, the slope in the first slope section 31 is constant.

The first time range is followed by a second time range from the second time t2 to a third time t3. The second time range can also be referred to as the second slope section 32. In the second time range, the drive variable AG increases with a second slope ST2, which expediently lies in a second slope range. The second slope ST2 is exemplarily lower than the first slope ST1. In particular, the second slope range is lower than the first slope range. For example, the average slope of the second slope range is less than the average slope of the first slope range. In the second slope section 32, the screw is screwed into the processing object with its thread. Exemplarily, in the second slope section 32 the torque acting on the tool 2—and in particular the drive variable AG correlated with the torque—increases continuously. The second slope section 32 has an approximately linear slope. Purely by way of example, the slope in the second slope section 32 is constant.

The first time range and the second time range together form a first course section 4 that extends from the first time t1 to the third time t3.

The second time range is followed by a third time range from the third time t3 to a fourth time t4. The third time range can also be referred to as the third slope section 33. In the third time range, the drive variable AG increases with a third slope ST3, which expediently lies in a third slope range. The third slope ST3 is exemplarily larger than the first slope ST1. In particular, the third slope range is higher than the first slope range. For example, the average slope of the third slope range is greater than the average slope of the first slope range. In the third slope section 33, the screw head is driven into the material of the processing object. Exemplarily, in the third slope section 32 the torque acting on the tool 2—and in particular the drive variable AG correlated with the torque—increases continuously. The third slope section 33 has an approximately linear slope. Purely by way of example, the slope in the third slope section 33 is constant.

Exemplarily, the drive variable AG does not increase further after the third time range and then drops, e.g. because the rotational driving of the tool 2 has been stopped.

The third time range forms a second course section 5, which extends from the third time t3 to the fourth time t4. The second course section 5 is arranged temporally after the first course section 4.

The power tool device 10, in particular the control unit 19, is adapted to determine a change criterion during the rotational driving of the tool 2 on the basis of the at least one detected drive variable AG and to change the rotational driving of the tool 2 in response to the detected drive variable AG satisfying the change criterion.

Preferably, the power tool device 10, in particular the control unit 19, is adapted to determine the change criterion individually for each working operation, in particular for each screwing-in operation and/or each drilling operation. In particular, a separate change criterion is determined for each working operation, which separate change criterion is expediently used in this working operation, in particular only in this working operation. Expediently, each change criterion is used only for the respective working operation in which it was determined. For each new working operation, a new change criterion is determined and expediently used.

By a working operation is meant in particular a screwing-in operation or a drilling operation. A respective working operation begins, for example, with the starting of the rotational driving of the tool 2 and/or with a user actuation of the first operating element 21. A respective working operation expediently continues as long as the drive unit 1 provides the rotational driving of the tool 2 and/or as long as the first operating element 21 remains actuated. Expediently, a respective working operation continues until (after stopping the rotational driving of the tool 2) a further starting of the rotational driving of the tool 2 occurs and/or until (after stopping the user actuation of the first operating element 21) a further user actuation of the first operating element 21 occurs. With the further start and/or the further user actuation, a new working operation begins. The previous working operation ends at the latest at the start of a new working operation. In particular, a working operation can continue as long as there is a continuous rotational driving of the tool 2 and/or a continuous user actuation of the first operating element 21 and preferably ends with the end of the continuous rotational driving and/or the continuous user actuation. Expediently, a minimum time period may be defined in the power tool device 10 that must have elapsed for an working operation to be considered completed. Optionally, the user can input via the operating device 18 that the current working operation has ended.

Preferably, the change criterion comprises a change threshold value WSW and the detected drive variable AG fulfills the change criterion when the slope of the detected drive variable AG reaches the change threshold value WSW. The change threshold value WSW is exemplarily larger than the first slope ST1 and/or smaller than the third slope ST3.

The power tool device 10, in particular the control unit 19, is accordingly preferably adapted to determine the change threshold value WSW during the rotational driving of the tool 2 on the basis of the at least one detected drive variable AG and to change the rotational driving of the tool 2 in response to the current slope of the detected drive variable AG reaching the change threshold value WSW. Preferably, the power tool device 10, in particular the control unit 19, is adapted to determine the change threshold value WSW individually for each working operation, in particular each screwing-in operation and/or each drilling operation. In particular, a separate change threshold value WSW is determined for each working operation. Expediently, each change threshold value WSW is used only for the respective working operation in which it was determined. For each new working operation, a new alternating threshold value WSW is determined and expediently used.

Preferably, the power tool device 10, in particular the drive device 6, preferably the control unit 19, is adapted to determine the change criterion on the basis of the slope, in particular a slope value, of the detected drive variable AG. The slope value is, for example, an average slope. Furthermore, the slope value can be a maximum slope.

For example, the power tool device 10 is adapted to determine the change threshold value WSW as the change criterion on the basis, in particular by multiplication, of the slope, in particular the slope value, of the drive variable AG and a factor and to change the rotational driving of the tool 2 when the current slope of the detected drive variable AG reaches the change threshold value WSW. The change threshold value WSW is thus expediently the product of the slope, in particular the slope value, of the drive variable and the factor.

Preferably, the power tool device 10, in particular the control unit 19, is adapted to determine the change criterion, in particular the change threshold value WSW, on the basis of a slope, in particular a slope value, of the first course section 4, in particular of the first slope section 31, preferably only of the first slope section 31. The power tool device 10 determines the change threshold WSW in particular based on a calculated slope value of the first slope section 31. The slope value is, for example, the average slope of the first slope section 31. Furthermore, the slope value may be the maximum slope of the first slope section 31. Expediently, the slope value is based exclusively on the slope of the first slope section 31 and, in particular, not on a slope of the second slope section 32 and/or not on a slope of the third slope section 33.

Exemplarily, the power tool device 10 is adapted to detect the end of the first slope section 31, for example based on the slope of the temporal course 3. For example, the power tool device 10 is adapted to continuously calculate the slope of the temporal course 3 and to detect the end of the first slope section 31 based on the continuously calculated slope, for example based on the fact that the continuously calculated slope decreases. The power tool device 10 is expediently adapted, in response to having detected the end of the first slope section 31, to calculate the slope value on the basis of which it calculates the change criterion, in particular the change threshold value WSW, and/or the change criterion, in particular the change threshold value WSW. Expediently, the power tool device 10 calculates the slope value only after the slope section 31 is completed. For example, the power tool device 10 calculates the slope value, on the basis of which it calculates the change criterion, as an average or as a maximum slope of the first slope section 31.

Preferably, the power tool device 10, preferably the control unit 19, is adapted to change the rotational driving of the tool 2 in response to a slope of the second course section 5 satisfying the change criterion. The change criterion is fulfilled, by way of example, when the slope of the second course section 5 reaches the change threshold value WSW.

Preferably, the power tool device 10 is configured to reduce the rotational driving of the tool 2, stop the rotational driving of the tool 2, and/or change the rotational driving of the tool 2 to pulsed operation in response to the detected drive variable AG satisfying the change criterion. In particular, the change of the rotational driving of the tool 2 is such that the screw driven by the tool 2 is not further screwed into the processing object. The change in the rotational driving of the tool 2 is expediently effected by the control unit 19 changing its control of the drive unit 1, for example so that the motor current of the drive unit 1 is reduced.

For example, when the rotational driving is changed, the torque acting on the tool 2 is reduced, for example to zero or to a value greater than zero. In pulsed operation, for example, temporally spaced torque pulses are applied to the tool 2 (by means of the drive unit 1). Between the torque pulses, the torque acting on the tool 2 can be reduced to zero.

Provided that the change of the rotational driving consists in switching off the rotational driving, the change criterion can also be called switch-off criterion and the change threshold value can be called switch-off threshold value.

Preferably, the power tool device 10 has several different screwing-in modes. The user can select a screwing-in mode from the available screwing-in modes, expediently by means of the operating device, in particular by means of the second operating element 22. For example, the second operating element 22 can be moved into a plurality of different positions, in particular rotary positions, and different screwing-in modes are assigned to different positions.

The power tool device 10 is adapted to determine the change criterion, in particular the change threshold WSW, taking into account the selected screwing-in mode. For example, each screwing-in mode is assigned a respective factor that is used in the calculation of the change threshold value WSW. Exemplarily, the power tool device 10 is adapted to determine, depending on the selected screwing-in mode, the factor on the basis of which the change threshold value WSW is calculated—i.e., the factor that is multiplied by the slope value of the temporal course 3 to calculate the change threshold value WSW.

Figure 3:
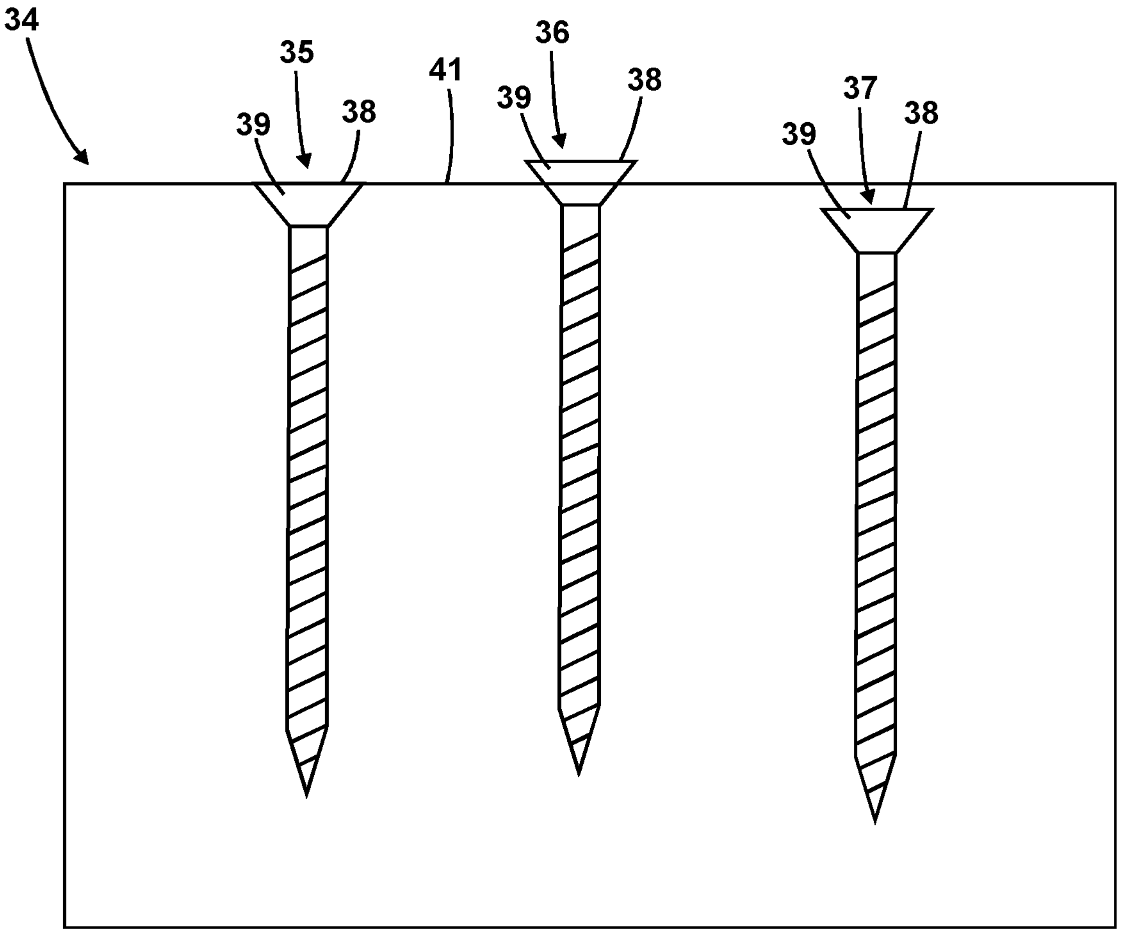

With reference to FIG. 3, three exemplary screwing-in modes will be explained below.

FIG. 3 shows a processing object 34 and three screws 35, 36, 37 screwed in different screwing-in modes.

In an exemplary embodiment, the power tool device 10 has a first screwing-in mode. The first screwing-in mode was used to screw the first screw 35 into the processing object 34. The first screwing-in mode is used to screw in a screw so that, at the end of the working operation, the top 38 of its screw head 39 is flush with the surface 41 of the processing object 34. In the first screwing-in mode, the rotational driving of the tool 2 is changed, in particular reduced, stopped and/or changed to the pulsed operation, when the screw 35 has the top 38 of its screw head 39 flush with the surface 41 of the processing object 34. In particular, the power tool device 10 is configured to select the change threshold WSW in the first screwing-in mode such that the slope of the temporal course 3 reaches the change threshold WSW when the screw 35 has the top 38 of its screw head 39 flush with the surface 41 of the processing object 34. Expediently, in the first screwing-in mode, the power tool device 10 uses a first factor for calculating the change threshold value WSW, which is selected such that the slope of the temporal course 3 reaches the change threshold value WSW when the screw 35 has the top 38 of its screw head 39 flush with the surface 41 of the processing object 34. The first factor is expediently predetermined and/or stored in advance—i.e. before the respective operation is performed—in the power tool device 10. For example, the first factor is determined empirically.

In an exemplary embodiment, the power tool device 10 has a second screwing-in mode. The second screwing-in mode was used to screw the second screw 36 into the processing object 34. The second screwing-in mode is used to screw in a screw such that the screw protrudes with the top 38 of its screw head 39 above the surface 41 when the working operation is completed. In the second screwing-in mode, the rotational driving of the tool 2 is changed, in particular reduced, stopped and/or changed to the pulsed operation, when the screw 36 protrudes with the top 38 of its screw head 39 above the surface 41. In particular, the power tool device 10 is configured to select the change threshold value WSW in the second screwing-in mode such that the slope of the temporal course 3 reaches the change threshold value WSW when the screw 36 protrudes with the top 38 of its screw head 39 above the surface 41, expediently with the screw head 39 partially immersed in the processing object 34. Expediently, in the second screwing-in mode, the power tool device 10 uses a second factor for calculating the change threshold value WSW, which factor is selected such that the slope of the temporal course 3 reaches the change threshold value WSW when the screw 35 protrudes with the top 38 of its screw head 39 above the surface 41, expediently with the screw head 39 partially immersed in the processing object 34. The second factor is expediently predetermined and/or stored in advance—i.e. before the respective working operation is carried out—in the power tool device 10. The second factor is empirically determined, for example. The second factor is exemplarily smaller than the first factor. In the second screwing-in mode, the change threshold WSW is exemplarily smaller than in the first screwing-in mode.

In an exemplary embodiment, the power tool device 10 has a third screwing-in mode. The third screwing-in mode has been used to screw the third screw 37 into the processing object 34. The third screwing-in mode is used to screw in a screw so that, when the working operation is completed, the top 38 of its screw head 39 is countersunk below the surface 41. In the third screwing-in mode, the rotational driving of the tool 2 is changed, in particular reduced, stopped and/or changed to the pulsed operation, when the screw 37 is sunk with the top 38 of its screw head 39 under the surface 41. In particular, the power tool device 10 is adapted to select the change threshold WSW in the third screwing-in mode such that the slope of the temporal course 3 reaches the change threshold WSW when the screw 36 with the top 38 of its screw head 39 is sunk below the surface 41. Expediently, in the third screwing-in mode, the power tool device 10 uses a third factor for calculating the change threshold value WSW, which third factor is selected such that the slope of the temporal course 3 reaches the change threshold value WSW when the screw 35 is countersunk with the top 38 of its screw head 39 below the surface 41. The third factor is expediently predetermined and/or stored in advance—i.e. before the respective working operation is carried out—in the power tool device 10. For example, the third factor is empirically determined. The third factor is exemplarily larger than the first factor. In the third screwing-in mode, the change threshold WSW is exemplarily greater than in the first screwing-in mode.

Preferably, the factor, in particular the first factor, second factor and/or third factor and/or the change threshold WSW can be manipulated by a user, for example by means of the operating device 18, and/or is fixed.

Optionally, the screwing-in mode can be selected by means of a device additional to the drive device 6, for example an IoT device, i.e. an Internet-of-Things device, in particular by the user.

As explained above, the power tool device 10 multiplies the slope value of the temporal course 3 by a factor to calculate the change threshold WSW. Preferably, the power tool device 10 adjusts the factor according to the selected screwing-in mode. The power tool device 10 compares the change threshold value WSW with the further slope of the temporal course 3 and if the further slope reaches the change threshold value WSW, the power tool device 10 changes the rotational driving of the tool 2, in particular in such a way that the screw is not screwed in further.

Preferably, the change criterion, the change threshold value WSW and/or the factor can be specified by a user. For example, the change criterion, the change threshold value WSW and/or the factor can be entered via the operating device 18, in particular the second operating element 22. For example, the change criterion, the change threshold value WSW and/or the factor can be manipulated by the user or can be fixed.

Optionally, the change criterion, the change threshold WSW and/or the factor can be entered by means of a device additional to the drive device 6, for example an IoT device, i.e. an Internet-of-Things device, in particular by the user.

Preferably, the power tool device 10 is further adapted to take into account previous working operations, in particular screwing-in operations and/or drilling operations, when determining the change criterion. For example, the power tool device 10 is adapted to acquire and store work data during a respective working operation, and to use this work data in determining, in a subsequent working operation, the change criterion, in particular the change threshold value, preferably the factor. The work data comprise, for example, the detected actuator variable AG, in particular the temporal course 3. The work data may further comprise information about a correction actuation performed by the user, in particular of the first operating element 21, for example after the change of the rotational driving.

For example, the power tool device 10 is adapted to detect that the user has operated the first operating element 21 to further screw the screw into the processing object after the change of the rotational driving in response to the fulfillment of the change criterion. The power tool device 10 is expediently configured to provide correction information based on this detection as the work data, and to adjust the calculation of a change threshold value WSW for a subsequent working operation based on the correction information such that the change threshold value WSW is selected to be larger than it would have been selected if the correction information were not available.

Expediently, the power tool device 10 has an AI component, for example an artificial neural network, and is adapted to calculate the change criterion, in particular the change threshold, preferably the factor, using the AI component, for example taking into account work data, in particular from previous working operations.

As mentioned above, the drive variable AG is in particular an electrical variable, for example the motor current of the electric motor of the drive unit 1. Alternatively or additionally, a detected torque can also be used as drive variable AG. Optionally, the power tool device 10 comprises a sensor device 11 arranged at the effective location of the torque, in particular on a shaft 9, for directly detecting the torque, which can be used as the drive variable AG. The sensor device 11 comprises, for example, a strain gauge, a sensor for measuring mechanical stresses, a magnetostriction unit and/or a piezoelectric sensor unit for detecting a mechanical deformation. The sensor device 11 is configured to detect the torque on the shaft 9, in particular a drive shaft, an output shaft and/or a motor shaft. Furthermore, the sensor device 11 may be part of the attachment device 7 explained below.

Optionally, the power tool device 10 is adapted to detect on the basis of the detected drive variable AG, in particular on the basis of a/the temporal course of the drive variable AG, that the tool 2 or a screw driven by the tool encounters an undesirable obstacle, for example an electrical line, and to change the rotational driving, in particular to stop it, to reduce it and/or to change it to pulsed operation, on the basis of this detection. For example, an obstacle characteristic is stored in the power tool device 10, and the power tool device 10 is configured to compare the detected temporal course 3 of the drive variable AG with the obstacle characteristic and to change the rotational driving on the basis of the comparison, for example if the temporal course 3 corresponds to the obstacle characteristic.

Figure 4:
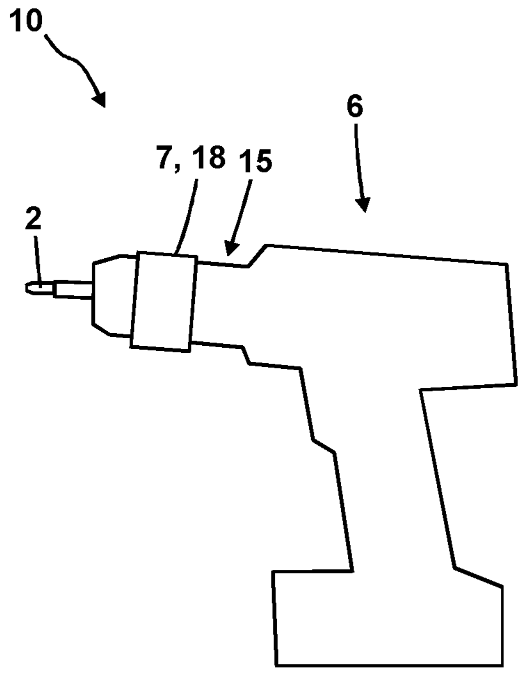

FIG. 4 shows an exemplary configuration of the power tool device 10, in which the power tool device 10 comprises an attachment device 7. The attachment device 7 is removably attached to the drive device 6, exemplarily to its shaft section 15. The attachment device 7 is communicatively connected to the drive device 6. The attachment device 7 can be designed as an additional handle, for example. The attachment device 7 is expediently not required for providing the rotational driving of the tool 2 by means of the drive unit 1. The attachment device 7 is preferably adapted to detect the drive variable AG, to calculate the change criterion, in particular the change threshold value WSW and/or the factor, and/or to check whether the detected drive variable AG satisfies the change criterion, for example whether the slope of the drive variable AG reaches the change threshold value. Preferably, the attachment device 7 comprises an attachment device sensor unit for detecting the drive variable AG and/or an attachment device control unit. The attachment control unit is expediently communicatively connected to the control unit 19, in particular wirelessly, for example via Bluetooth, and/or wired. The attachment device 7 can further be part of the operating device 18, in particular provide the second control element.

Figure 5:
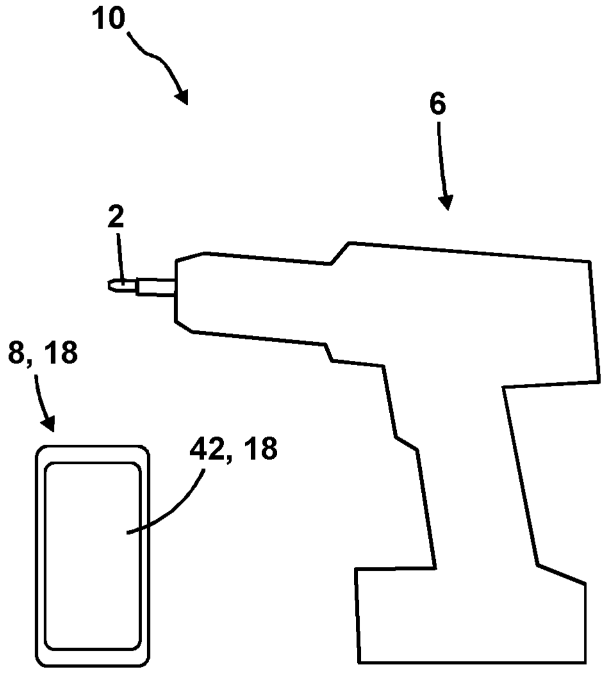

FIG. 5 shows an exemplary configuration of the power tool device 10, in which the power tool device 10 comprises a mobile device 8, for example a smartphone, which is communicatively connected to the drive device 6, in particular the control unit 19, in particular wired and/or wirelessly, for example via Bluetooth. The mobile device 8 is provided separately from the drive device 6. The mobile device 8 is preferably configured to detect the drive variable AG, to calculate the change criterion, in particular the change threshold value WSW and/or the factor, and/or to check whether the detected drive variable AG meets the change criterion, for example whether the slope of the drive variable AG reaches the change threshold value. Preferably, the mobile device 8 comprises a mobile device sensor unit for detecting the drive variable AG and/or a mobile device control unit. The mobile device control unit is expediently communicatively connected to the control unit 19, in particular wirelessly and/or wired. The mobile device 8 may further be part of the operating device 18, in particular provide the second control element. Exemplarily, the mobile device 8 comprises a touch screen 42 that forms part of the operating device 18 and, for example, provides the second operating element.

Figure 6:
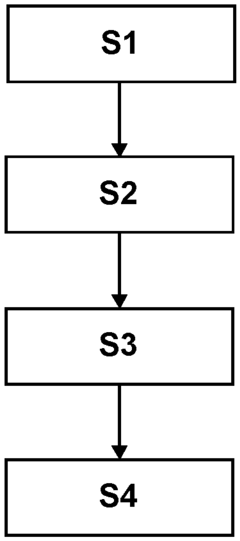

FIG. 6 shows a flowchart of a method for operating the power tool device 10. The method comprises a first step S1, in which the rotational driving of the tool 2 is started. For example, in the first step, the user operates the operating device 18, in particular the first operating element 21, to cause the drive unit 1 to start providing the rotational driving of the tool 2. Exemplarily, at this time, the tool 2 is engaged with a screw head of a first screw to be screwed into a processing object.

The method comprises a second step S2, in which at least one drive variable AG is detected during the rotational driving of the tool 2, the drive variable AG being the torque acting on the tool 2 and/or a drive variable AG associated with this torque, for example an electrical drive variable of the drive unit 1. For example, the power tool device 10 successively detects a plurality of values of the drive variable AG and thus records, in particular, the temporal course 3 of the drive variable AG. The acquisition of the drive variable AG is expediently continued during the third step S3 and/or fourth step S4. During the second step S2, the first screw is screwed into the processing object.

The method further comprises a third step S3, wherein during rotational driving of the tool 2, a change criterion is determined based on the detected at least one drive variable AG. For example, the power tool device 10 determines a slope value for the first slope section 31, wherein the slope value is, for example, the average slope or the maximum slope of the first slope section 31. The power tool device 10 multiplies the slope value by a factor to calculate a change threshold value WSW as the change criterion. During the third step, the first screw is screwed into the processing object.

The method further comprises a fourth step S4 of changing the rotational driving in response to the detected drive variable AG satisfying the change criterion. For example, the power tool device 10 continuously checks whether the current slope of the drive variable AG has reached the change threshold WSW—for example, is greater than or equal to the change threshold WSW. If the current slope has reached the change threshold WSW, the power tool device 10 determines that the change criterion has been met and changes the rotational driving of the tool 2 provided by means of the drive unit 1, in particular in such a way that the first screw is no longer screwed into the processing object. For example, the power tool device 10 stops or reduces the rotational driving or changes it to pulsed operation.

The above-mentioned steps S1 to S4 represent an exemplary first working operation, in particular a first screwing-in operation. The first working operation begins with step S1 and ends with step S4. Optionally, after step S4, the first working operation may comprise a further step in which the user performs, in particular within a predetermined time window, a correction actuation of the first operating element 21 in order to further screw the first screw into the processing object.

Optionally, the method comprises the further step that after the first working operation with the power tool device 10, a second working operation, in particular a second screwing-in operation, is carried out in which a second screw is screwed in. In the second working operation, steps S1 to S4 and optionally S5 are carried out again (with the second screw instead of the first screw), wherein in step S3 of the second working operation the change criterion, in particular the change threshold value, is recalculated. Exemplarily, the slope value in the second operation is different from the slope value in the first operation, so that a different change criterion, in particular a different change threshold value WSW, results in the second operation than in the first operation.

The invention claimed is:

1. A power tool device comprising a drive unit for a rotational driving of a tool, wherein the power tool device is adapted to detect at least one drive variable during the rotational driving of the tool, wherein the drive variable is the torque acting on the tool and/or a drive variable associated with this torque, and wherein the power tool device is adapted to determine, during the rotational driving of the tool, a change criterion on the basis of the at least one detected drive variable and to change the rotational driving of the tool in response to the detected drive variable satisfying the change criterion, wherein the power tool device is adapted to reduce the rotational driving, terminate the rotational driving and/or change the rotational driving of the tool to pulsed operation in response to the detected drive variable satisfying the change criterion.

2. The power tool device according to claim 1, wherein the change criterion comprises a change threshold value and the detected drive variable satisfies the change criterion when the slope of the detected drive variable reaches the change threshold value.

3. The power tool device according to claim 1, wherein the power tool device is adapted to determine the change criterion individually for each working operation.

4. The power tool device according to claim 1, wherein the power tool device is adapted to determine the change criterion on the basis of the slope of the detected drive variable.

5. The power tool device according to claim 4, wherein the power tool device is adapted to determine, as the change criterion, a change threshold value on the basis of the slope and a factor, and to change the rotational driving of the tool when the slope of the detected drive variable reaches the change threshold value.

6. The power tool device according to claim 5, wherein the change criterion, the change threshold value and/or the factor is specifiable by a user.

7. The power tool device according to claim 5, wherein the power tool device is adapted to determine the change threshold value on the basis of a multiplication of the slope and the factor.

8. The power tool device according to claim 1, wherein the power tool device has several different screwing-in modes, wherein a screwing-in mode among the screwing-in modes is selectable by the user, and the power tool device is adapted to determine the change criterion taking into account the selected screwing-in mode.

9. The power tool device according to claim 8, wherein the screwing-in modes comprise a first screwing-in mode for changing the rotational driving when a screw to be screwed into the surface has the top of its screw head flush with the surface, a second screwing-in mode for changing the rotational driving when the screw has the top of its screw head projecting above the surface and/or a third screwing-in mode for changing the rotational driving when the screw is countersunk with the top of its screw head below the surface.

10. The power tool device according to claim 1, wherein the power tool device is further adapted to take into account previous screwing-in operations and/or drilling operations when determining the change criterion.

11. The power tool device according to claim 1, comprising a drive device comprising the drive unit, and an attachment device, detachably attached to the drive device, for detecting the drive variable, determining the change criterion, and/or checking whether the detected drive variable satisfies the change criterion.

12. The power tool device according to claim 1, comprising a drive device comprising the drive unit, and a mobile device, which is communicatively connected to the drive device and is adapted for detecting the drive variable, determining the change criterion and/or checking whether the detected drive variable satisfies the change criterion.

13. The power tool device according to claim 1, further comprising a sensor device arranged at the effective location of the torque for directly detecting the torque.

14. The power tool device according to claim 1, wherein the power tool device is adapted to detect, on the basis of the detected drive variable that the tool or a screw driven by the tool encounters an undesired obstacle and to change the rotational driving on the basis of this detection.

15. The power tool device according to claim 1, wherein the power tool device is designed as a screwing and/or drilling device, and the tool is designed as a drill or a screwdriver blade.

16. The power tool device according to claim 1, wherein the drive variable is an electrical drive variable of the drive unit.

17. The power tool device according to claim 1, wherein the power tool device is adapted to determine the change criterion individually for each screwing-in operation and/or for each drilling operation.

18. A power tool device comprising a drive unit for a rotational driving of a tool, wherein the power tool device is adapted to detect at least one drive variable during the rotational driving of the tool, wherein the drive variable is the torque acting on the tool and/or a drive variable associated with this torque, and wherein the power tool device is adapted to determine, during the rotational driving of the tool, a change criterion on the basis of the at least one detected drive variable and to change the rotational driving of the tool in response to the detected drive variable satisfying the change criterion, wherein the power tool device is adapted to detect a temporal course of the drive variable.

19. The power tool device according to claim 18, wherein the temporal course comprises a first course section and a second course section arranged temporally after the first course section, and wherein the power tool device is adapted to determine the change criterion based on a slope of the first course section.

20. The power tool device according to claim 19, wherein the power tool device is adapted to change the rotational driving of the tool in response to a slope of the second course section satisfying the change criterion.

21. A method for operating a power tool device having a drive unit for rotational driving a tool, the method comprising the steps:

starting the rotational driving of the tool, during the rotational driving of the tool, detecting at least one drive variable, the drive variable being the torque acting on the tool and/or a drive variable associated with this torque, during the rotational driving of the tool, determining a change criterion based on the detected at least one drive variable, and changing the rotational driving in response to the detected actuator variable satisfying the change criterion, wherein the power tool device reduces the rotational driving, terminates the rotational driving and/or changes the rotational driving of the tool to pulsed operation in response to the detected drive variable satisfying the change criterion.

* * * * *